May 9, 1950 M. SCHWEIZER 2,507,423
ROTATING CUTTING REEL POWER MOWER
Filed Feb. 7, 1947 2 Sheets-Sheet 2
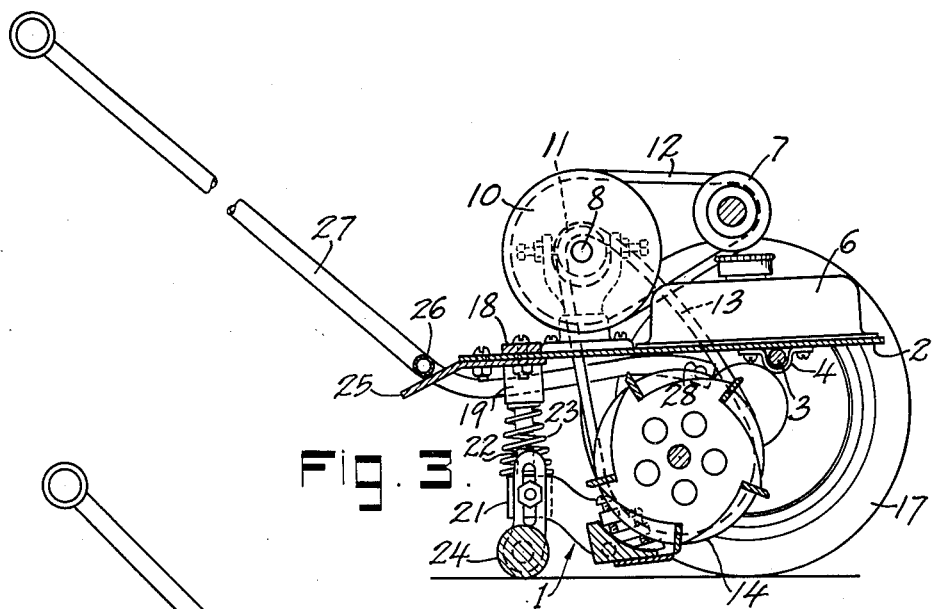
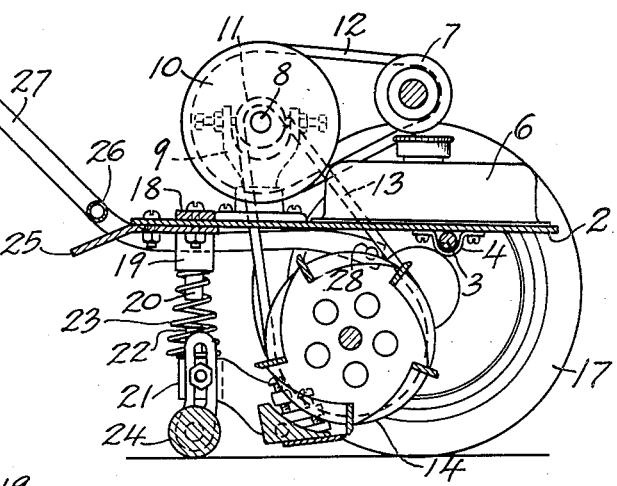
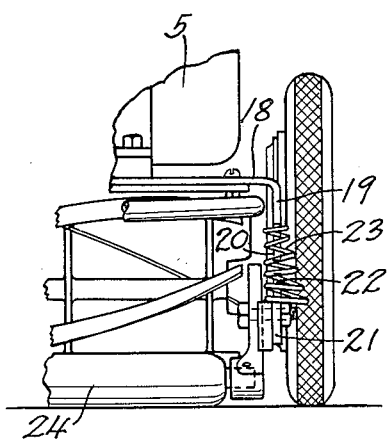
INVENTOR.
MAX SCHWEIZER
BY Nathan Levin
ATTORNEY Patented May 9, 1950

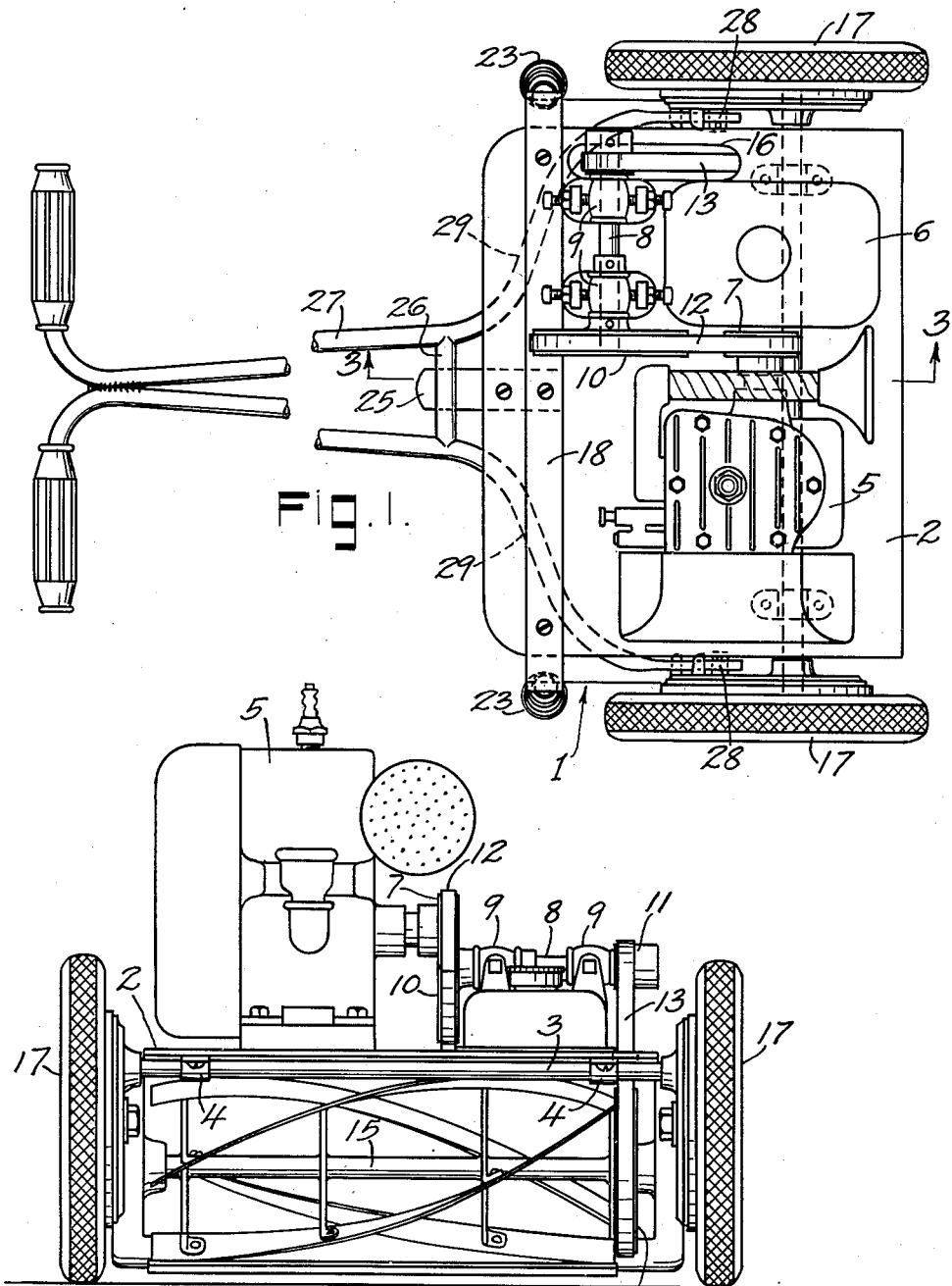

2,507,423

UNITED STATES PATENT OFFICE 2,507,423

ROTATING CUTTING REEL POWER MOWER

Max Schweizer, Oneonta, N. Y.

Application February 7, 1947, Serial No. 727,249

7 Claims. (Cl. 56—26)

The present invention relates to lawn mower construction and more particularly to manually guided, power propelled lawn mowers.

It is an object of the present invention to provide a simple, efficient and inexpensive means for delivering power from a prime mover to a lawn mower for propulsion and operation of the latter and which is controlled by the different positions of the lawn mower handle so that the lawn mower may be stopped and started as desired by the operator thereof.

It is a further object to provide an attachment by means of which power from a prime mover may be delivered to a standard type of hand lawn mower for power operation of the latter and which is controlled by the raising or lowering of the lawn mower handle.

It is a further object of the invention to provide a plate, pivotally arranged upon a shaft of a standard type of hand lawn mower, and upon which is mounted a prime mover, jack shaft and pulleys operatively connected to the cutting reel of the lawn mower, for power operation of the cutting reel and the ground wheels under control of the lawn mower handle. The manual raising and the lowering of the lawn mower handle changing the position of the plate, and the parts thereon, relative to the lawn mower, the cutting reel thereof particularly, whereby power from the prime mover on the plate may be selectively applied to the cutting reel and the ground wheels.

With these and other objects in view, this invention consists in certain novel features of construction, combination and arrangement of parts to be hereinafter more fully described and claimed.

The invention is described in connection with the accompanying drawings in which:

Figure 1 is a plan view of the lawn mower embodying the invention,

Figure 2 is a front view in elevation of the lawn mower,

Figure 3 is a sectional view of the lawn mower taken on line 3—3 of Figure 1,

Figure 4 is a sectional view similar to that of Figure 3 but with the handle in raised position, and Figure 5 is a partial view of the rear of one side of the lawn mower showing in detail the spring mounting of the plate.

Referring in detail to the drawings, the numeral 1 indicates a conventional type of lawn mower to which the power attachment may be applied. A plate or platform 2 of generally rectangular shape is provided and this is pivotally mounted to swing about the standard cross bar 3, on the forward part of the mower, by means of the U-shaped straps 4, 4 which pass around the bar 3 and are fastened to the underside of the plate 2, by any suitable means. In this way the plate 2, and the parts mounted thereon, may be pivotally moved as a unit relative to the lawn mower. A prime mover 5 and fuel tank 6 of any suitable standard construction is mounted on one side of the plate 2, as shown in Figures 1 and 2, and is provided with the belt pulley 7 on its power take off shaft. Also carried by the plate 2 is the jack shaft 8 mounted in the adjustable bearings 9, 9 which are fastened to the plate 2, the shaft 8 being parallel to the power take off shaft of the prime mover 5 and having a belt pulley 10 at one end thereof in line with the pulley 7 and having a belt pulley 11 at the other end thereof in line with a belt pulley 14 mounted upon one end of the cutting reel 15 of the lawn mower. Driving belts 12 and 13 are trained over the pulleys 7 and 10 and 11 and 14 respectively, the latter passing through the opening 16 in the plate 2, whereby power may be transmitted from the prime mover to the cutting reel of the lawn mower. The belt 12 is normally in power transmitting position whereas the belt 13 is selectively in a tight or loose position, depending upon the position of the mower handle, to transmit or not to transmit power, as will be explained.

Normally in hand lawn mowers the ground wheels 17, 17 are caused to turn as the lawn mower is manually moved and this movement of these wheels usually, through a one way clutch or other driving arrangement, causes the cutting reel 15 to be operatively turned. In the present arrangement however, this one way clutch or driving arrangement has been reversed so that upon the application of power to the cutting reel 15 from and by means of the driving belt 13, the ground wheels 17, 17 as well as the cutting reel 15, are power actuated to cause the lawn mower to be power driven over the ground and to cause the cutting reel to be power operated.

Secured to the rear of the plate 2 is the transverse strip 18 having the depending lugs 19, 19 over each side of the plate and undercut as at 20. Upstanding lugs 21, 21, in line with the lugs 19, 19, are secured to the usual lawn mower bracket supporting the small rear ground contact roller 24, these lugs being likewise undercut as at 22. Coil springs 23, 23, which may be tapered, are placed between the in line lugs 19, 19 and 21, 21 taking over the undercut portions 20 and 22 thereof. An arm 25 is fastened to the rear of the plate 2 and takes under the cross arm 26 of the handle 27. The handle 27 is pivoted at 28 and has a limited amount of play, as usual in a standard type of mower. At times the plate 2 is designed to rest upon the spread arm portions 29, 29 of the handle 27, as when the handle is in raised position, Figure 4, and there is a limited amount of play between the cross 26 of the handle 27 and the projecting arm 25 of the plate 2. When the handle 27 is in lowered position, Figure 3, the plate 2 and the parts thereon rest upon and compress the coil springs 23, 23, with the cross arm 26 of the handle 27 resting upon the projecting arm 25 of the plate 2. In the position of the parts shown in Figure 3 the belt 13 is in its loose or non-driving position, whereas in the position of the parts shown in Figure 4 the belt 13 is in its tight or driving position.

In the operation of the lawn mower with the present power attachment, after the prime mover has been started, it is merely necessary to manually raise the handle 27 to cause the mower to be power actuated. The raising of the handle 27 causes the arms 29, 29 thereof to take under and raise the rear end of the unbalanced plate 2 which in turn is pivoted upwardly about the cross 3, thus tightening the driving belt 13 and causing the cutting reel 15 and the ground wheels 17, 17 to be power operated to operate the lawn mower. To stop the lawn mower it is merely necessary to lower the handle 27 which permits the plate 2 and the parts thereon, due to the unbalanced weight thereof, to be pivoted downwardly about the rod 3, thus causing the driving belt 13 to be loosened and to cease the transmission of power to the cutting reel and the ground wheels. The distribution of the parts on the plate 2 is such that the combined weight thereof rests upon the rod 3 in an unbalanced state which causes the plate 2 to be urged in a counterclockwise direction, Figures 3 and 4, against the coil springs 23, 23 which are slightly compressed thereby. In other words there is a floating action to the plate 2 which causes the springs 23, 23 to be slightly compressed when the handle is in lowered position. When the handle is raised, the load on the springs is removed and there is enough play in the handle to cause the belt 13 to be tight as the handle arms 29, 29 turn the plate 2 in clockwise direction against the unbalanced weight thereof. This unbalanced weight is calculated so that the average user of the lawn mower may readily use the same without tiring. Furthermore once the belt 13 has been placed in tight driving position, the turning action of the parts has a tendency to keep the same in position with a lessening of the strain upon the operator of the lawn mower.

It will be seen that I have provided a power attachment for a standard type of lawn mower which is simple and inexpensive to build, which has no controls on the handle and which is extremely simple to operate. In the operation of the mower, if the cutting reel should encounter foreign bodies, such as stones or pieces of wood, it will not be broken or irreparably injured inasmuch as the drive belt 13 may slip when the cutting reel encounters such obstructions.

I claim:

1. In a mower of the character described having a frame, supporting wheels, a cutting reel operably connected to the wheels, and a lengthwise extending operators handle having its lower end pivotally secured to said frame, said handle extending outwardly from said frame and having hand gripping arms at its upper end by means of which said handle may be swingably raised and lowered relative to the frame, the combination therewith of a driven pulley on the cutting reel, an engine operatively related to a drive pulley, an endless drive belt passing over said pulleys to establish a direct drive between said drive pulley and said cutting reel, a platform carrier supporting said engine and said drive pulley and pivotally mounted on said frame in operative relation to said handle, means interposed between said carrier and said frame to maintain said carrier in a position of rest when said handle is in its lowered position, said carrier at rest positioning said drive pulley and belt in loose non-driving relation to said cutting reel pulley, and interengaging means between said handle and said carrier to tilt the latter away from its position of rest when said handle is raised to thereby increase the distance between said pulleys and place said belt in tight driving position thereon.

2. In a mower of the character described having a frame, supporting wheels, a cutting reel operably connected to the wheels, and a lengthwise extending operators handle having its lower end pivotally secured to said frame, said handle extending outwardly from said frame and having hand gripping arms at its upper end by means of which said handle may be swingably raised and lowered relative to the frame, the combination therewith of a driven pulley on the cutting reel, an engine operatively related to a drive pulley, an endless drive belt passing over said pulleys to establish a direct drive between said drive pulley and said cutting reel, a platform carrier supporting said engine and said drive pulley and pivotally mounted on said frame in operative relation to the power end portion of said handle, the weight distribution of said carrier and the parts thereon unbalancing the same downwardly in the direction of said handle, means interposed between the unbalanced side of said carrier and said frame to maintain said carrier in a position of rest when said handle is in its lowered position, said carrier at rest positioning said drive pulley and belt in loose non-driving relation to said cutting reel pulley, and interengaging means between the lower end portion of said handle and the unbalanced side of said carrier to tilt the latter away from its position of rest when said handle is raised to thereby increase the distance between said pulleys and place said belt in tight driving position thereon.

3. In a mower of the character described having a frame, supporting wheels, a cutting reel operably connected to the wheels, and a lengthwise extending operators handle having its lower end pivotally secured to said frame, said handle extending outwardly from said frame and having hand gripping arms at its upper end by means of which said handle may be swingably raised and lowered relative to the frame, the combination therewith of a driven pulley on the cutting reel, an engine operatively related to a drive pulley, an endless belt passing over said pulleys to establish a direct drive between said drive pulley and said cutting reel, a platform carrier supporting said engine and drive pulley and pivotally mounted on a cross bar on said frame above the lower end portion of said handle, the weight distribution of said carrier and the parts thereon unbalancing the same downwardly in the direction of said handle, springs interposed between said frame and the unbalanced side of said carrier to maintain the latter in a position of rest when said handle is in its lowered position, said carrier at rest positioning said drive pulley and belt in loose non-driving relation to said cutting reel, and interengaging means between the lower end portion of said handle and the unbalanced side of said carrier to tilt the latter upwardly from its position of rest when said handle is raised to thereby increase the distance between said pulleys and place said belt in tight driving position thereon.

4. In a mower of the character described having a frame, supporting wheels, a cutting reel operably connected to the wheels, and a lengthwise extending operators handle having its lower end pivotally secured to said frame, said handle extending outwardly from said frame and having transversely extending hand gripping arms at its upper end by means of which said handle may be swingably raised and lowered relative to the frame, the combination therewith of a driven pulley on the cutting reel, an engine operatively related to a drive pulley, an endless belt passing over said pulleys to establish a direct drive between said drive pulley and said cutting reel, a platform carrier supporting said engine and said drive pulley and pivotally mounted on a cross bar on said frame directly above the lower end portion of said handle, the weight distribution of said carrier and the parts thereon unbalancing the same downwardly in the direction of said handle, depending lugs on the unbalanced side of said carrier, upstanding lugs on said frame in line with said depending lugs, springs in compression interposed between each pair of in line lugs to maintain said carrier in a position of rest when said handle is in its lowered position, said carrier at rest positioning said drive pulley and belt in loose non-driving relation to said cutting reel pulley, and means comprising the lower end portion of said handle engaging the unbalanced side of said carrier to tilt the latter upwardly from its position of rest when said handle is raised to thereby increase the distance between said pulleys and place said belt in tight driving position thereon.

5. In a mower of the character described having a frame, supporting wheels, a cutting reel operably connected to the wheels, a ground roller rotatably supported at its opposite ends by said frame in spaced parallel relation to and at one side of said cutting reel, and a lengthwise extending operators handle having at one of its ends a pair of spread arms pivotally secured to said frame, said handle extending outwardly from said frame and having transversely extending hand gripping arms at its other end by means of which said handle may be swingably raised and lowered relative to the frame, the combination therewith of a driven pulley on the cutting reel, an engine operatively related to a drive pulley, an endless drive belt passing over said pulleys to establish a direct drive between said drive pulley and said cutting reel, a platform carrier supporting said engine and drive pulley and pivotally mounted on a bar extending across said frame on the opposite side of said cutting reel, said carrier extending over the spread handle arms and above said cutting reel and ground roller, the weight distribution of said carrier and the parts thereon unbalancing the same downwardly in the direction of said handle, depending lugs on the unbalanced side of said carrier above the end portions of said ground roller, upstanding lugs on said frame in line with said depending lugs, springs in compression interposed between each pair of in line lugs to maintain said carrier in a position of rest when said handle is in its lowered position, said carrier at rest positioning said drive pulley and belt in loose non-driving relation to said cutting reel pulley, and means comprising said spread handle arms engaging with the unbalanced side of said carrier to tilt the latter upwardly from its position of rest when said handle is raised to thereby increase the distance between said pulleys and place said belt in tight driving position thereon.

6. In a mower as set forth in claim 4, in which the unbalanced side of said carrier has a projecting member extending toward said handle and in which said handle has means adapted to engage said member to provide a resting place for said handle in its lowered position when said carrier is in its position of rest.

7. In a mower as set forth in claim 5, in which the unbalanced side of said carrier has a projecting tongue extending toward said handle and in which the spread arms of said handle has a transversely extending cross bar adapted to engage the upper surface of said tongue to provide a resting place for said handle in its lowered position when said carrier is in its position of rest.

MAX SCHWEIZER.

REFERENCES CITED

The following references are of record in the file of this patent:

UNITED STATES PATENTS

| Number | Name | Date |
|---|---|---|
| 1,819,791 | Reed | Aug. 18, 1931 |
| 1,866,380 | Wagner | July 5, 1932 |
| 2,133,512 | Herge | Oct. 18, 1938 |
| 2,220,705 | Burches | Nov. 5, 1940 |
| 2,256,583 | Squires | Sept. 23, 1941 |